US007428860B2

(12) United States Patent
Vagnby

(10) Patent No.: US 7,428,860 B2
(45) Date of Patent: Sep. 30, 2008

(54) CHEESE SLICER WITH A CUTTING WIRE ON A ROTABLE ARM AND A HOLDING ARM

(75) Inventor: Marcus Vagnby, Rodekro (DK)

(73) Assignee: P.E.J. Danmark AS, Rodekro (DK)

( * ) Notice: Subject to any disclaimer, the term of this patent is extended or adjusted under 35 U.S.C. 154(b) by 353 days.

(21) Appl. No.: 10/560,818

(22) PCT Filed: May 19, 2004

(86) PCT No.: PCT/DK2004/000353

§ 371 (c)(1),
(2), (4) Date: Jan. 19, 2006

(87) PCT Pub. No.: WO2005/014244

PCT Pub. Date: Feb. 17, 2005

(65) Prior Publication Data

US 2006/0144204 A1 Jul. 6, 2006

(30) Foreign Application Priority Data

Jul. 31, 2003 (DK) .............................. 2003 01116

(51) Int. Cl.

*B26D 7/20* (2006.01)
*B26D 1/44* (2006.01)
*B26D 1/00* (2006.01)
*B23D 25/02* (2006.01)

(52) U.S. Cl. ....................... 83/651.1; 83/651; 83/307.1; 83/932; 83/940

(58) Field of Classification Search ................ 83/651.1, 83/651, 940, 932, 307.1, 591; 99/540, 543, 99/545

See application file for complete search history.

(56) References Cited

U.S. PATENT DOCUMENTS

| | | | | |
|---|---|---|---|---|
| 674,803 | A * | 5/1901 | Thunell | 83/591 |
| 1,309,417 | A * | 7/1919 | Luschka et al. | 83/440 |
| 1,659,340 | A * | 2/1928 | Von Glahn | 83/562 |
| 1,881,623 | A * | 10/1932 | Jassoy | 30/116 |
| 2,182,656 | A * | 12/1939 | Bruggimann | 83/155 |
| 2,953,853 | A * | 9/1960 | Tieman | 83/57 |
| 3,821,916 | A * | 7/1974 | Ricci et al. | 83/200.1 |
| 6,796,211 | B1 * | 9/2004 | Braunberger | 83/745 |

FOREIGN PATENT DOCUMENTS

| | | |
|---|---|---|
| EP | 0081466 | 6/1983 |
| WO | 03/051587 | 6/2003 |

* cited by examiner

*Primary Examiner*—Boyer D. Ashley
*Assistant Examiner*—Bharat C Patel
(74) *Attorney, Agent, or Firm*—Dennison, Schultz & MacDonald

(57) ABSTRACT

A cheese slicer having a bottom plate on which a block of cheese can be placed, a vertical guide rod mounted on the bottom plate having an external thread on which a slicing arm with a slicing string, and a roundel with an internal thread, which is received on the external thread. The slicer also has a holding arm, which holds the upper part of the block of cheese in position during the slicing operation. The holding arm includes a second roundel, which is coupled to the slicing arm roundel, and which has an internal flush bore such that the holding arm is slidably mounted on the guide rod below the slicing arm roundel and moves vertically. The holding arm prevents tilting of the cheese and the cutting of slices not of uniform thickness.

5 Claims, 7 Drawing Sheets

CHEESE SLICER WITH A CUTTING WIRE ON A ROTABLE ARM AND A HOLDING ARM

This application is a filing under 35 USC 371 of PCT/DK2004/000353 filed May 19, 2004.

BACKGROUND OF THE INVENTION

The present invention relates to a cheese slicer having a bottom plate, an upstanding, externally threaded vertical guide rod and a slicing arm with slicing string, the slicing arm having a roundel with internal threads received on the external threads of the guide rod.

It is a drawback in the known cheese slicer that the cheese is not sufficiently held in place and can tilt and needs to be supported by one hand during the slicing operation. It will therefore be necessary to use both hands when a slice is to be cut. Furthermore, there is a risk that the slices will not be of uniform thickness.

SUMMARY OF THE INVENTION

It is a purpose of the present invention to provide a cheese slicer in which the cheese is fixed in position so that the above drawbacks in the known cheese slicers are avoided. This is achieved by providing a holding arm with a roundel coupled to and below the slicing arm roundel, and which travels vertically with the slicing arm.

A first preferred embodiment of the invention provides means for a coupling of the holding arm to the slicing arm.

Another preferred embodiment of the invention provides attachment of a tongue for the coupling of the holding arm to the slicing arm.

Another preferred embodiment of the invention provides for the attachment of the holding arm at a determined vertical plane during the slicing operation.

In another preferred embodiment of the invention, the holding arm roundel is guided both externally and internally on the vertical guide rod.

BRIEF DESCRIPTION OF THE DRAWINGS

The invention is explained in detail below with reference to the drawing in which.

DESCRIPTION OF THE PREFERRED EMBODIMENTS

Figure 1:
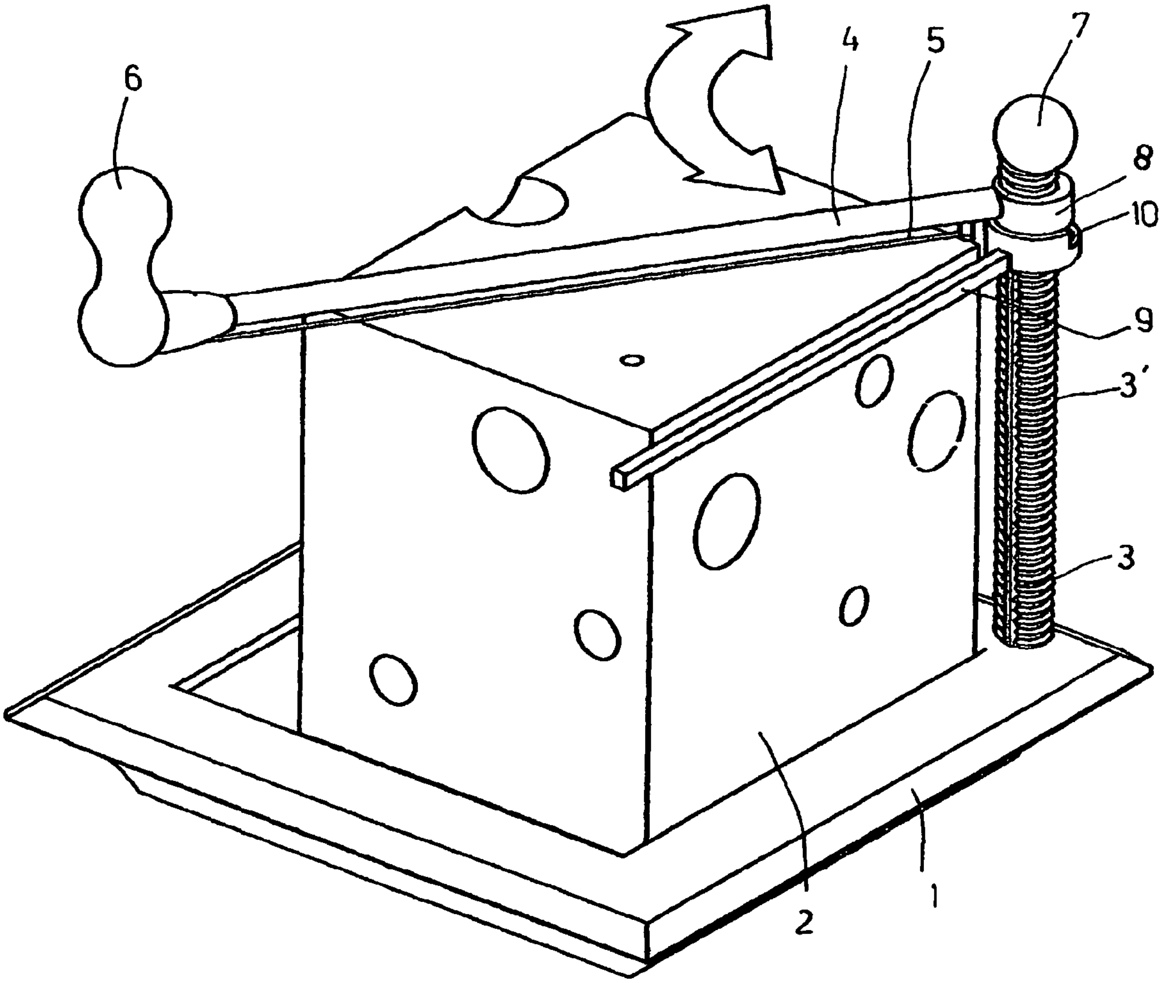
FIG. 1 is a perspective view seen slantingly from above of a cheese slicer according to the invention with a block of cheese in position.

As shown in the drawing a cheese slicer comprises a bottom plate 1 on which a block of cheese 2, which is to be sliced, can be placed. The bottom plate is mounted with a vertical guide rod 3 with a ball shaped hand knob 7 at the top and with an external thread 3'. On the guide rod 3 is mounted a swingable slicing arm 4 with a slicing string 5. At its farthest end the slicing arm is embodied with a roundel 8 with an internal thread 8' mating the thread 3' so that the slicing arm 4, when turned round once clockwise, is moved a distance downwards equal to the pitch of the thread 3'.

Figure 10:
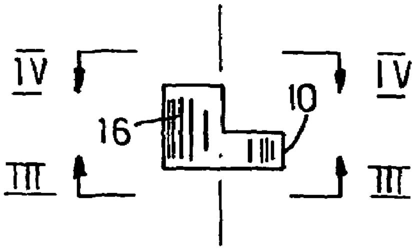
FIG. 10 is a side view of a roundel for a holding arm.
Figure 12:
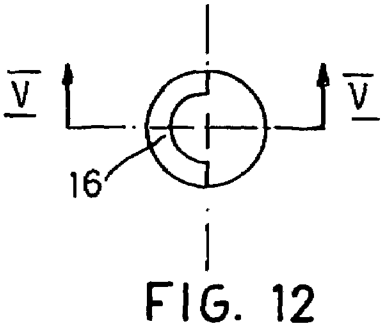
FIG. 12 shows the roundel seen in the direction of the arrows IV-IV in FIG. 10.

According to the invention the cheese slicer is furthermore under the slicing arm 4 embodied with a holding arm 9, which at its inner end is connected to a roundel 10, which as shown in FIG. 10 has an internal flush bore 10' with a diameter D, which is slightly larger than or equal to the outer diameter d of the thread 3'.

The holding arm 9 with the roundel 10 can therefore be slidably mounted on the guide rod 3 under the roundel 8.

Figure 2:
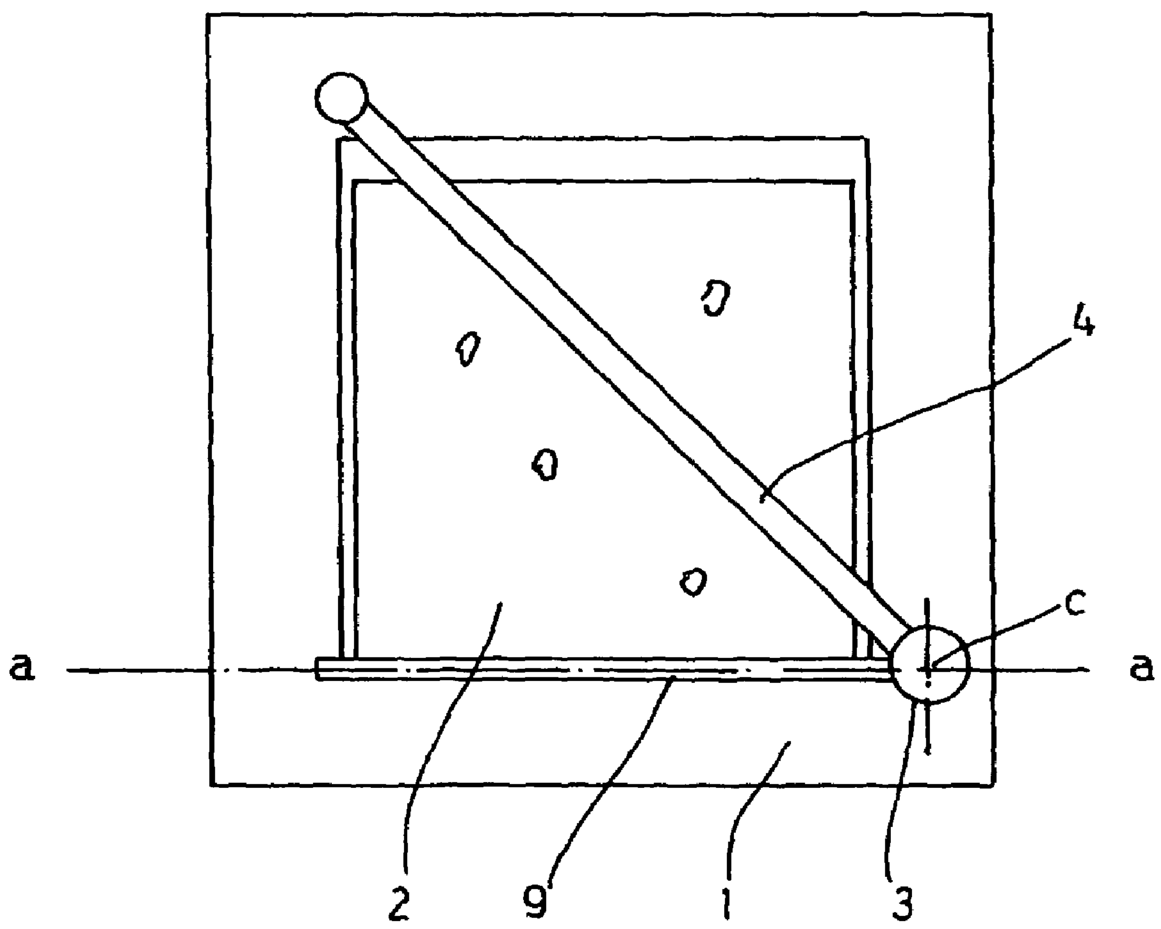
FIG. 2 is a top view of the cheese slicer.
Figure 3:
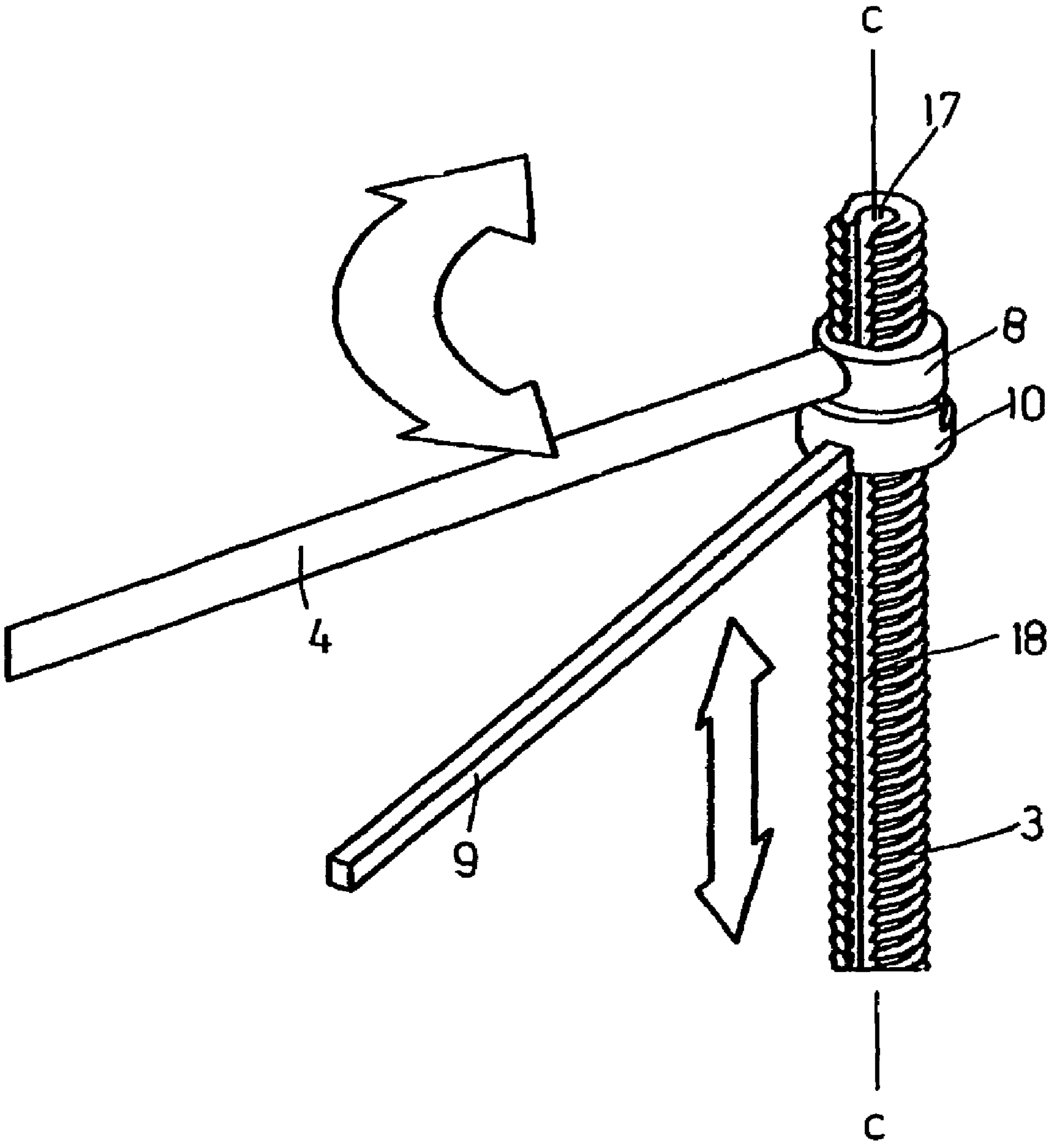
FIG. 3 is a perspective view of a section of the guide rod with a slicing rod attached and a holding arm for a cheese slicer according to the invention.

As shown in FIG. 2 the guide rod 3 is located outside a corner of the cheese 2 with its centre line c-c at a vertical plane a-a, which preferably is located outside and can be parallel with the side of the cheese, which is to be supported during the slicing operation.

Figure 4:
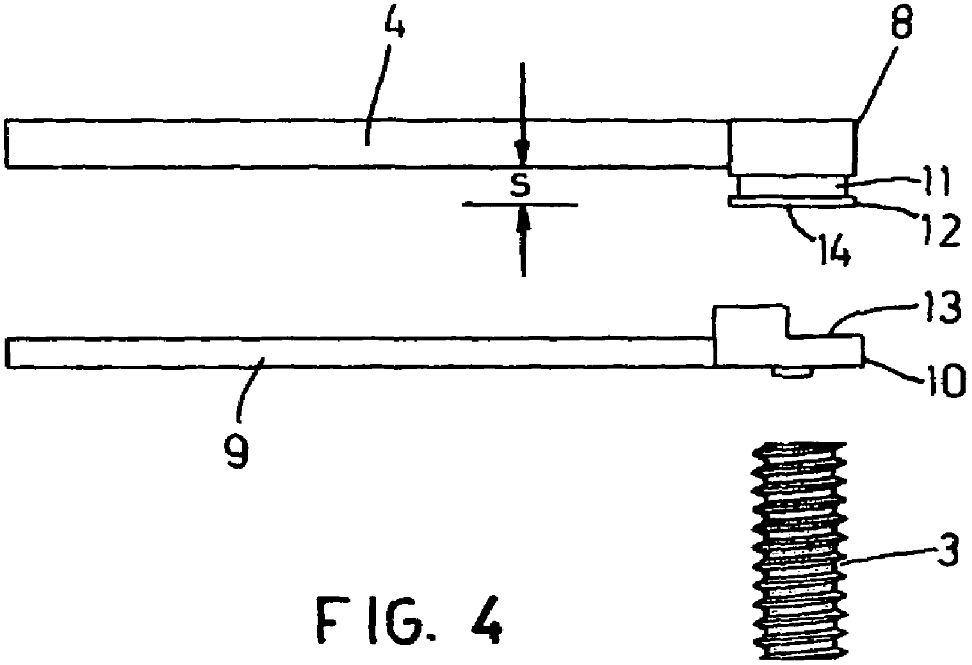
FIG. 4 is a split side view of part of a guide rod, a slicing rod, and a holding arm before they are mounted on the guide rod.
Figure 5:
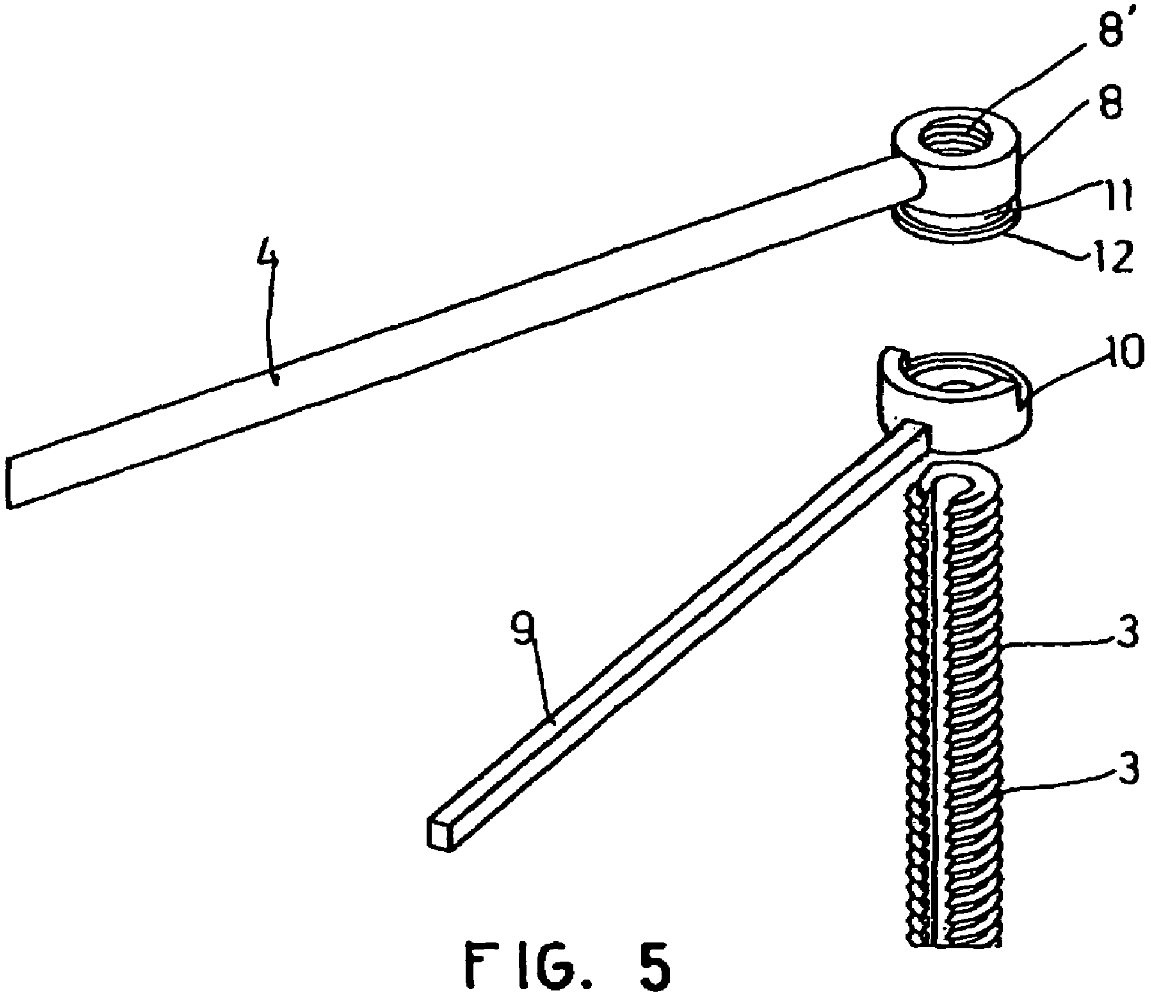
FIG. 5 supplements the view in FIG. 3 with the parts shown in perspective.
Figure 7:
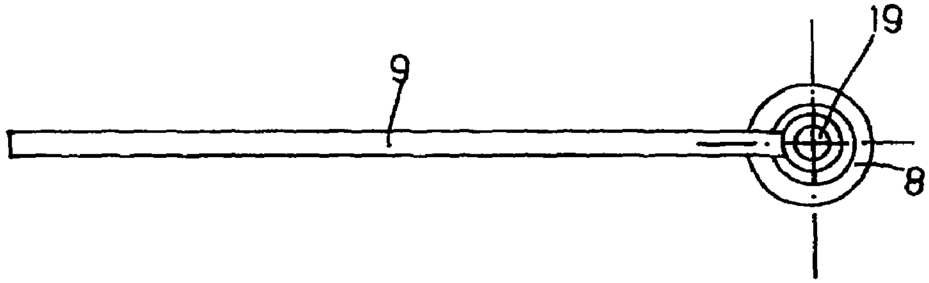
FIG. 7 shows a holding arm with belonging roundel viewed in the direction of the arrows in I-I in FIG. 6.
Figure 6:
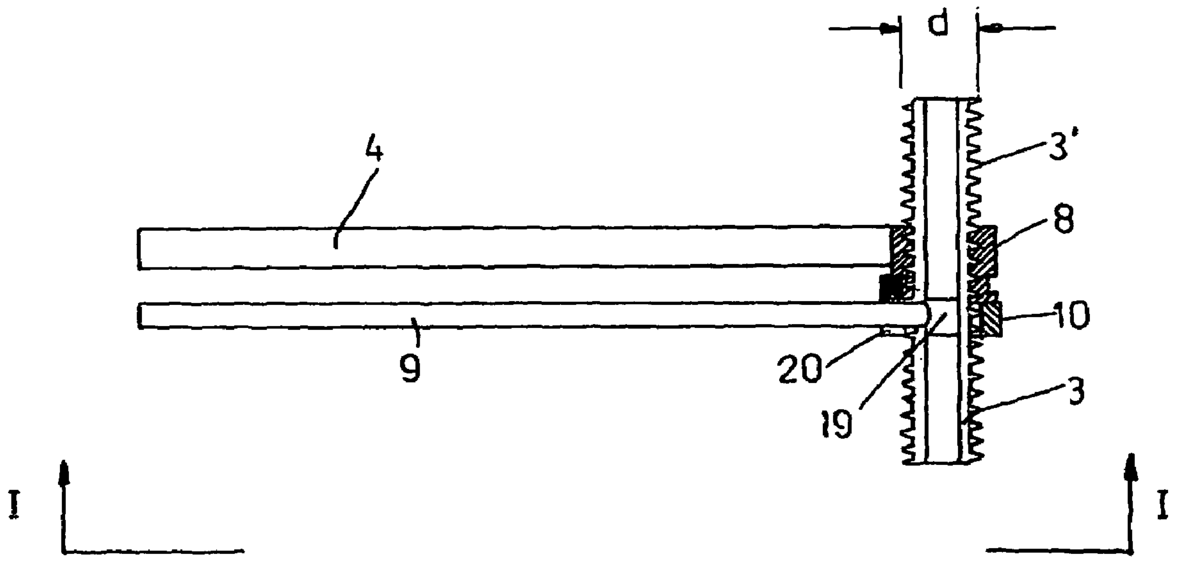
FIG. 6 shows a section through a guide rod and roundel for the slicing arm with a roundel coupled to a holding arm for a cheese slicer according to the invention.
Figure 9:
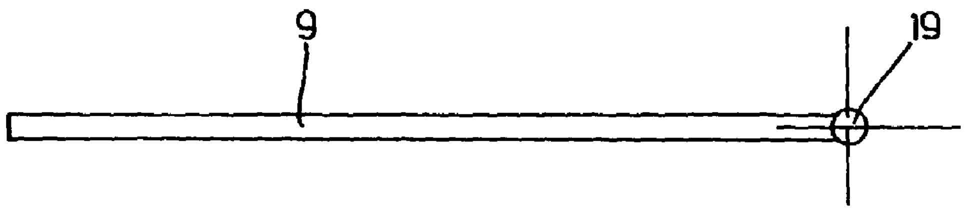
FIG. 9 shows the holding arm viewed in the direction of the arrows II-II in FIG. 8.
Figure 8:
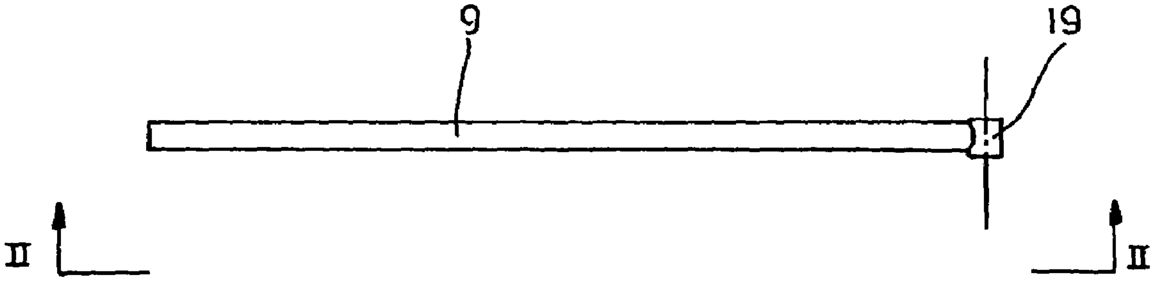
FIG. 8 shows a holding arm without roundel for a cheese slicer according to the invention.
Figure 13:
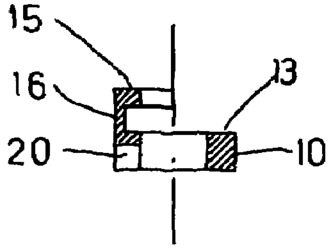
FIG. 13 shows a section after the line V-V in FIG. 12.

As shown in FIG. 4 the roundel 8 reaches a distance s below the arm 4 and is here embodied with an annular milled groove or trace 11, whereby a circumferential edge or collar 12 is formed at the bottom of the roundel. As shown in FIGS. 4, 6 and 13 the roundel 10 on the holding arm 9 has a larger outer diameter than the collar 12 and is embodied with a plane top side 13 against which the under side 14 of the collar 12 can rest. The roundel 10 is furthermore embodied with an edge or tongue 15, which can fit into the groove 11 when the collar 12 is placed on and slid sideways in over the top side 13 of the roundel 10. This results in a coupling of the roundel 8 on the slicing arm 4 and the roundel 10 on the holding arm 9 and thereby constitutes a coupling of the arm 9 to the arm 4, so that the arm 9 will take part in the vertical movement of the arm 4 when the latter arm is turned.

As shown in FIGS. 6, 10, 12 and 13 the roundel 10 can on part of the circumference be embodied with a sectionally ring-shaped raised part 16, which has an inner radius, which is larger than the outer radius of the collar 12. The tongue 15 is as shown embodied as an internal edge at the top of the raised part 16.

As shown the guide rod 3 is embodied as a tube with an inner space 17. The tube is embodied with a through-going slit 18 in the tube wall, which slit is located along a carrier in the plane a-a. The holding arm 9, or an extension of it, is carried a distance into the roundel 10, and the roundel 10 is placed on the rod 3 so that the holding arm 9 or an extension of it is carried down into the slit 18.

Figure 11:
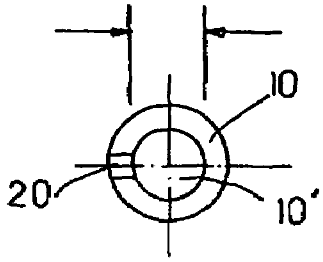
FIG. 11 shows the roundel seen in the direction of the arrows III-III in FIG. 10.

The holding arm 9 has a square section and at its end it is embodied with a transverse, cylindrical element 19 with an outer diameter, which is equal to the internal diameter of the hollow space 17 and fits into it with an easy sliding fit. As shown in FIG. 11 the roundel 10 has in the wall side into its bottom part a milled portion 20, which can take up and maintain the holding arm 9 in position.

The shown and described cheese slicer serves only to illustrate the invention. Within the framework of the invention it is possible to imagine various modifications. For example, the guiding of the holding arm 9 in the plane a-a could be embodied in a different way. The holding arm 9 can also instead of being straight be imagined carried out with a bend and have a land plate at the end, and the holding arm 9 and its belonging roundel 8 can instead of two parts also be imagined embodied as a single unit.

The invention claimed is:

1. Cheese slicer comprising:

a bottom plate constructed and arranged for receiving a block of cheese to be sliced, a vertical guide rod extending upwardly from the bottom plate, the vertical guide rod having an external thread and terminating in a ball-shaped hand knob, a slicing arm with a slicing string therealong, and a handle at a distal end and, at a proximal end, a rotatably mounted slicing arm roundel with an internal thread, which is received on the external thread of the guide rod and is swingably mounted, a holding arm comprising at a proximal end a second roundel coupled to and below the slicing arm roundel, the second roundel having an internal flush bore with a diameter (D) slightly larger than or equal to the vertical guide rod to enable the holding arm to be mounted slidably on the guide rod under the slicing arm roundel, the second roundel being movable vertically with the slicing arm roundel to maintain the holding arm at a predetermined vertical level along a side of the block of cheese, the holding arm being constructed and arranged to rest against and hold an upper part of a block of cheese on the bottom plate during slicing, the rod being located outside a corner of the cheese with a center line (c-c) in a vertical plane (a-a), which is located parallel with a side of the cheese which is to be supported during the slicing operation.

2. Cheese slicer according to claim 1, wherein the slicing arm roundel extends a distance s below the slicing arm and comprises a milled groove or trace, resulting in a circumferential edge or collar at the bottom of the slicing arm roundel, the second roundel having a larger outer diameter than the collar and comprising a planar top side against which an under side of the collar rests, the second roundel also having an edge or tongue which can be engaged in the groove when the collar is placed on or slid sideways over a top side of the second roundel.

3. Cheese slicer according to claim 2, wherein the second roundel has a ring-shaped circular raised part with an internal radius on a section of the circumference, the internal radius being equal to or slightly larger than an outer radius of the collar, the tongue being an internal edge on top of the raised part.

4. Cheese slicer according to claim 1, wherein the guide rod comprises a tube with an internal hollow space and a longitudinal through-going slit, and the holding arm or a holding arm extension is positioned into the second roundel, the holding arm roundel being positioned on the rod such that the holding arm or holding arm extension is positioned into the slit.

5. Cheese slicer according to claim 4, wherein the holding arm has a square cross section comprises at the proximal end a transverse cylindrical element which has an outer diameter equal to internal diameter of the hollow space and fits into the hollow space by light sliding movement, the second roundel having in the under side in a side wall a milled groove which can take up and hold the holding arm in position.

* * * * *